(12) United States Patent
Holme

(10) Patent No.: US 7,500,604 B2
(45) Date of Patent: Mar. 10, 2009

(54) CHAMBERED PRESENTATION INSTRUMENTS AND METHODS

(75) Inventor: Gary M. Holme, Centennial, CO (US)

(73) Assignee: First Data Corporation, Englewood, CO (US)

(*) Notice: Subject to any disclaimer, the term of this patent is extended or adjusted under 35 U.S.C. 154(b) by 205 days.

(21) Appl. No.: 11/233,947

(22) Filed: Sep. 22, 2005

(65) Prior Publication Data

US 2007/0063054 A1    Mar. 22, 2007

(51) Int. Cl.
*G06K 5/00* (2006.01)

(52) U.S. Cl. .............. 235/380; 235/490; 235/491; 235/375; 235/487; 235/492; 40/1.5; 40/1.6; 40/124.06; 40/124.11; 40/124.12; 40/439; 40/445; 40/124.01; 40/406; 40/407; 40/408

(58) Field of Classification Search ......... 235/490–491; 40/1.5–1.6, 124.06, 124.11, 124.12, 439, 40/445, 124.01, 410, 406–408
See application file for complete search history.

(56) References Cited

U.S. PATENT DOCUMENTS

| | | | |
|---|---|---|---|
| 6,019,284 A * | 2/2000 | Freeman et al. ............. 235/380 |
| 7,104,458 B2 * | 9/2006 | Schmuck et al. ............. 235/492 |
| 7,264,155 B2 * | 9/2007 | Halbur et al. ............... 235/380 |
| 2003/0065624 A1 | 4/2003 | James et al. |
| 2003/0150141 A1 | 8/2003 | Waldron |
| 2004/0011876 A1 | 1/2004 | Schmuck et al. |
| 2004/0128876 A1 * | 7/2004 | Cheek et al. ............. 40/124.12 |
| 2004/0211830 A1 | 10/2004 | Algiene |
| 2005/0107152 A1 | 5/2005 | McGee et al. |
| 2006/0080871 A1 * | 4/2006 | McGoey et al. .......... 40/124.11 |
| 2007/0045399 A1 * | 3/2007 | Martin ....................... 238/380 |

* cited by examiner

Primary Examiner—Michael G Lee
Assistant Examiner—Kristy A Haupt
(74) Attorney, Agent, or Firm—Townsend and Townsend and Crew LLP

(57) ABSTRACT

Transactional presentation instrument systems having one or more chambers, and method of using and constructing such systems are provided. Systems can include a presentation instrument, an information storage medium configured to store a unique identifier, and a chamber having a fluid component and an object component. The object component can include a plurality of items that float in or disperse throughout the fluid component.

22 Claims, 2 Drawing Sheets

US 7,500,604 B2

CHAMBERED PRESENTATION INSTRUMENTS AND METHODS

BACKGROUND OF THE INVENTION

The present invention generally relates to transactional presentation instruments. More particularly, the present invention relates to chambered transactional presentation instrument systems and devices, and to methods for using and constructing such instruments.

Presentation instruments such as transaction cards, credit cards, debit cards, ATM cards, bank cards, stored value cards, gift cards, or the like, are well known for providing consumers with access to goods and services and are increasingly replacing other types of tender in consumer transactions. Such instruments may include a variety of different indicia to identify the instrument and other features, such as the instrument issuer, the customer, terms and conditions of use, or the like, depending in part on the type of instrument. The information may be printed on the instrument using alphanumeric characters, graphics, or the like, or may be embossed into the instrument.

Graphics, such as printed designs, have also been applied to presentation instruments to provide marketing opportunities to card issuers and aesthetic appeal to card users. Relatedly, such features on presentation instruments can often serve as a convenient ice-breaker that allows individuals to express themselves. However, there remain limitations to the currently used designs that adorn these instruments. Often, such embellishments consist simply of a two-dimensional picture or illustration affixed to the surface of the instrument. For these and other reasons, there is a need for improved systems, devices, and methods that enhance user interest and aesthetic enjoyment of such presentation instruments.

The instant invention addresses this unfulfilled need by providing chambered presentation instruments that include amusing or ornamental features for those who view or otherwise use the instruments.

BRIEF SUMMARY OF THE INVENTION

Advantageously, the present invention provides chambered presentation instruments that are well suited for elevating or enhancing the experience of anyone using such items. For example, presentation instruments can include unusual ornamentation that adds value to the instrument as a collector item, or reflects the personality of the user. Similarly, chamber features on the instrument can be selected by the user so as to coordinate with their clothing or other fashion accessories, or to accommodate various artistic or thematic preferences. In some instances, a chamber on one presentation instrument may be configured to allow the user to distinguish that presentation instrument from another otherwise similar presentation instrument.

In a first aspect, the present invention provides a presentation instrument system. The presentation instrument system can include a presentation instrument, an information storage medium configured to store a unique identifier, and a chamber. In some aspects, the chamber can include a fluid component and an object component. In related aspects, the fluid component can include a fluid, a gas, or a combination thereof. In other related aspects, the object component can include a plurality of items that float in or disperse throughout the fluid component. In some cases, the information storage medium can include a magnetic strip, a bar code, or a contactless integrated circuit. In some case, the information storage medium can include an integrated circuit having an antenna for transmitting and receiving data at the instrument. Often, the presentation instrument can be a credit card, a debit card, or a stored value card. The presentation instrument can include a signature strip and/or a presentation instrument advertisement. In some cases, the object component can include an object component advertisement.

In one aspect, the present invention provides a presentation instrument system that includes a presentation instrument, an information storage medium configured to store a unique identifier, and a chamber having a fluid component and an object component, where the object component includes a plurality of items that float in or disperse throughout the fluid component.

In another aspect, the present invention includes a method of making a presentation instrument system. The method can include providing a presentation instrument, coupling an information storage medium with the presentation instrument, and coupling a chamber with the presentation instrument. The method can also include placing a fluid component into the chamber. The fluid component can include a fluid, a gas, or a combination thereof. In some aspects, the method can include placing an object component into the chamber, and the object component can include a plurality of items that float in or disperse throughout the fluid component. The method can also include placing a presentation instrument advertisement on the presentation instrument.

A further understanding of the nature and advantages of the present invention may be realized by reference to the detailed description and claims when considered in connection with the drawings, wherein like reference numerals are used throughout the several drawings to refer to similar components. The drawings, which are not necessarily to scale, illustratively depict embodiments of the present invention and are not intended to limit the scope of the invention.

DETAILED DESCRIPTION OF THE INVENTION

Figure 1:
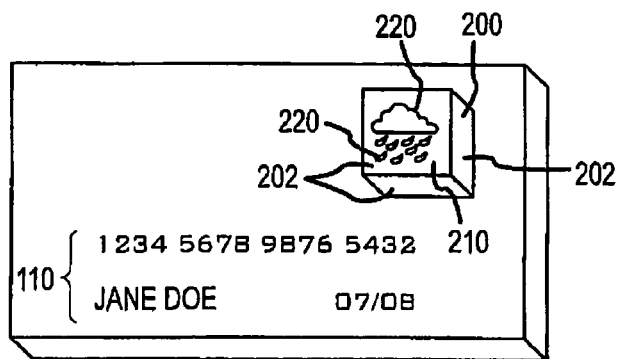
FIG. 1 illustrates a presentation instrument system according to one embodiment of the present invention.

The present invention generally provides improved transactional presentation instrument systems with integrated or attached chambers, as well as method of using and constructing such devices. Turning now to the drawings, FIG. 1 illustrates a presentation instrument system 10 according to one embodiment of the present invention. Typically, presentation instrument system 10 includes a presentation instrument 100 and a chamber 200. It is appreciated that presentation instrument 100 can be any of a variety of transaction instruments, including credit cards such as VISA®, MasterCard®, and American Express®, debit cards such as ATM cards, bank cards, prepaid phone cards, airline cards, frequent buyer cards, casino cards, hotel room door access cards, insurance cards, library cards, discount cards, membership cards, entertainment cards, travel cards, supermarket check-out cards, retail store charge cards, gift cards, calendar cards, prepaid debit cards, restaurant tip cards, driver's licenses or other identification cards, various stored value cards, or any other type of financial, healthcare, or transaction presentation instrument, and the like. Exemplary presentation instruments are further discussed in U.S. patent application Ser. No. 09/971,303 filed Oct. 3, 2001, Ser. No. 10/421,604 filed Apr. 22, 2003, Ser. No. 10/922,815 filed Aug. 19, 2004, and Ser. No. 11/155,323 filed Jun. 17, 2005, the entire contents of which are incorporated herein by reference. As those skilled in the art will appreciate, in many cases an attribute 110 such as a user's name, account number, and/or expiration date can be disposed on or embossed into the surface of presentation instrument 100.

Presentation instrument 100 can be coupled with or integrated with a chamber 200 for holding any of a variety of materials or combinations of materials. Chamber 200 can contain a fluid component 210 and an object component 220. In the embodiment shown in FIG. 1, fluid component 210 includes water, and object component 220 includes an image of a cloud and a plurality of dispersed particles resembling rain drops. In a similar embodiment, fluid component 210 can include water, and object component 220 can include small white particular matter. A user can shake such a presentation instrument 100 so as to disperse the particulate matter throughout the water, and thereby enjoy the resulting snow globe effect.

Figure 2:
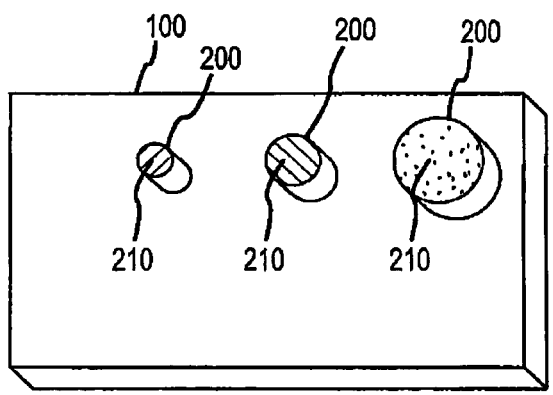
FIG. 2 illustrates a presentation instrument system according to one embodiment of the present invention.

It is appreciated that in some cases, chamber 200 can be integrated or otherwise permanently fixed with presentation instrument 100. In other cases, chamber 200 can be releasably coupled with presentation instrument 100. Chamber 200 can be constructed in any of a variety of shapes and sizes, and presentation instrument system 10 may include any number of chambers 200. In the embodiment depicted in FIG. 1, presentation instrument system 10 includes a block-shaped chamber 200. In the embodiment depicted in FIG. 2, presentation instrument system 10 includes three cylinder-shaped chambers 200, each containing a different fluid component 210. In some cases, chamber 200 may include only fluid component 210. In other case, chamber 200 may include only object component 220. In related cases, chamber 200 may include a combination of fluid component 210 and object component 220. The interior of chamber 200 may be at, above, or below atmospheric pressure. In some cases, a vacuum may exist in chamber 200.

As shown in FIG. 1, chamber 200 typically includes an assembly of chamber walls 202, which can be constructed from any of a variety of materials or combination of materials. For example, chamber walls 202 can be constructed of a clear transparent plastic material, a tinted or colored transparent plastic material, a colored opaque plastic material, and the like. Chamber walls 202 may include designs, writings, etchings, or any other type of treatment. In the embodiment shown in FIG. 3, a rear chamber wall 202 includes a printed scene including trees and a house. In many cases, chamber walls 202 are impermeable to fluid component 210 and object component 220. In some cases, however, chamber walls 202 may be permeable to fluid component 210, object component 220, or both. In other cases, chamber walls 202 are not completely sealed, and may have openings or apertures in fluid communication with the immediate ambient surroundings. Chamber 200 may be a fully self-contained unit, or it may be a partial structure that becomes fully self-contained in combination with the body of presentation instrument 100 when it is coupled thereto. For example, chamber 200 may be a hollow hemisphere that when coupled with the body of presentation instrument 100 defines a hemisphere shaped enclosure.

Fluid component 210 can include liquids, gases, or any combination thereof. Such liquids or gases may be fluorescent, luminescent, opaque, or exhibit various degrees of transparency. The consistency of fluid component 210 can vary widely, from thick and viscous to thin and watery. Fluid component 210 may be any color or combination of colors. Constituents of fluid component 210 may include, for example, water, oil, alcohol, syrup, vapor, scented fluids, or virtually any solution.

Object component 220 can include any desirable item, article, or material, or combination thereof. For example, object component 220 can include particulate matter, small shaped items such as stars, beads, pyramids, triangles, fibers, pins, cubes, and the like. The present invention also contemplates object component 220 items such as sand, holograms, game assemblies such as a ball with a tracking maze or a quoit-type ring and post combination, dominos, dice, bells, magic 8-ball, and the like. Other amusing items that can be part of object component 220 include figurines such as cartoon characters, animals, or aquatic creatures such as fish, ducks, or sharks. Items in object component 220 can be fluorescent, luminescent, opaque, or exhibit various degrees of transparency. Such items can be coated with or include reflective material. Object component 220 may include a single item, or may be an assembly or collection of multiple items. It is appreciated that object component 220 items can be reversibly or irreversibly attached with an interior surface of chamber wall 202. In some case, object component 220 items may be freely floating in or dispersed in fluid component 210. Other object component 220 items include photographs or other graphic or text images, data processing and/or storage elements, identification items, global positioning system elements, compasses, altimeters, barometers, thermometers, theft deterrent devices, chemical detectors, biological materials such as DNA, and pharmaceuticals.

Figure 3:
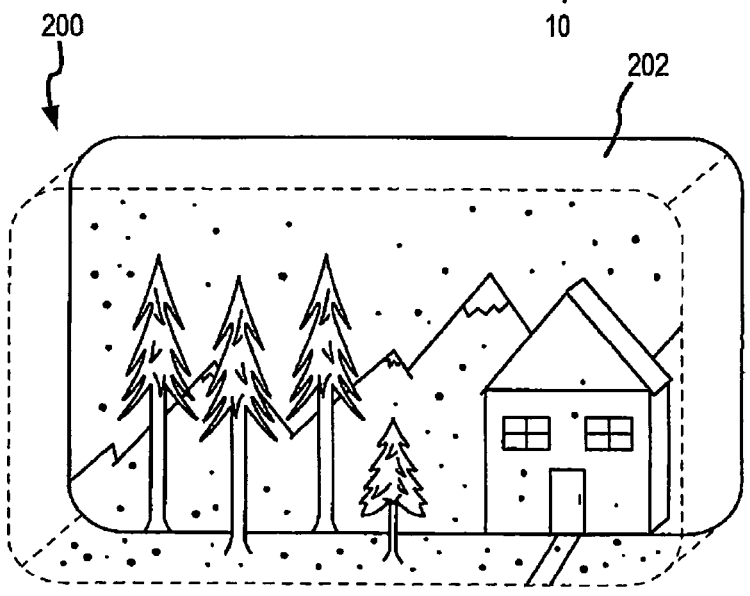
FIG. 3 illustrates a chamber according to one embodiment of the present invention.

In the embodiment shown in FIG. 3, fluid component 210 includes water, and object component 220 includes snowflakes, a snowman, a tree, and a figurine of a person. Chamber walls 202 are furnished with an image of a house, two trees, and mountains on a back panel, and a sidewalk on a bottom panel. It is understood that the combination of fluid component 210, object component 220, and any surface treatment on chamber wall 202 can provide a visual scene to be enjoyed by the presentation instrument holder. These scenes can represent seasonal holidays, or any other desired theme. In some cases, the theme may reflect the alma mater of the presentation instrument holder, and object component 220 may include sport figurines or other scholastic memorabilia.

Presentation instrument 100 may be formed from conventional materials including plastics, polymers, paper, and the like. It is appreciated that presentation instrument 100 and/or chamber 200 may comprise a variety of shapes and sizes depending on how it is to be displayed, packaged, and/or used, and as such is not limited to conventional standard size credit cards. Presentation instrument 100 and/or chamber 200 may comprise any rectangular, circular, semi-circular, oval, elliptical, rectangle, square, triangle, star, polygonal, regular, or irregular shape. In some instances, the design of instrument 100 and/or chamber 200 may be indicative of a merchant's business. For example, the shape of instrument 100 and/or chamber 200 may be in the form of a store front, shoes, athletic equipment (e.g., football, baseball, tennis racket), food products (e.g., pizza, donuts), beverage products, cars, animals, cartoon characters, consumers goods, and the like. Instrument 100 and/or chamber 200 may also include an aperture or other means for coupling instrument 100 and/or chamber 200 with to another object (e.g., a keychain).

Information may be included on presentation instrument 100, such as instructional information, advertising branding, promotional information, trademarks, website address, logos, graphics, a signature block or strip, or other elements for transaction processing. Presentation instrument 100 may include a variety of different indicia to identify the instrument and other features, such as the instrument issuer, the customer, an account, terms and conditions of use, or the like, depending in part on the type of instrument. Instrument 100 can also include indicia associated with vendors, merchants and/or service providers that sponsor or accept instrument 100. The information may be printed on the instrument using alphanumeric characters, graphics, or the like, or may be embossed into instrument 100. It is also understood that the indicia may be confined exclusively to a portion of the body of presentation instrument 100, or it may overlap both the body of presentation instrument 100 and chamber 200. For example, a focal point of a graphic may be centered on the body of presentation instrument 100 while background scenery spills over onto the adjacent chamber 200, providing a larger sized display of the graphic on the overall card assembly. Indicia may also be presented on one or more sides of presentation instrument 100. For example, instrument 100 may have a display side for promotional graphics and logos, and an instruction side that is opposite the display side that has instructional information, terms and conditions, and the like, for using instrument 100. The indicia may be included as part of the information used to activate presentation instrument 100.

Figure 4A:
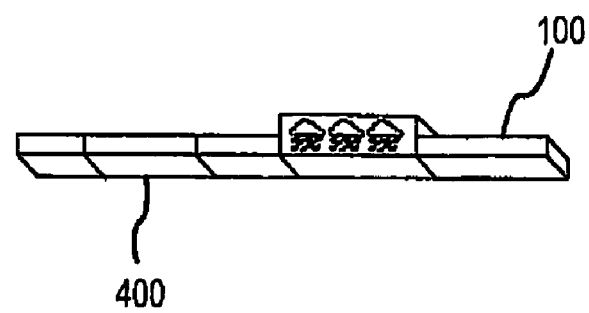
FIG. 4A illustrates a side cut-away view of a presentation instrument system according to one embodiment of the present invention.
Figure 4B:
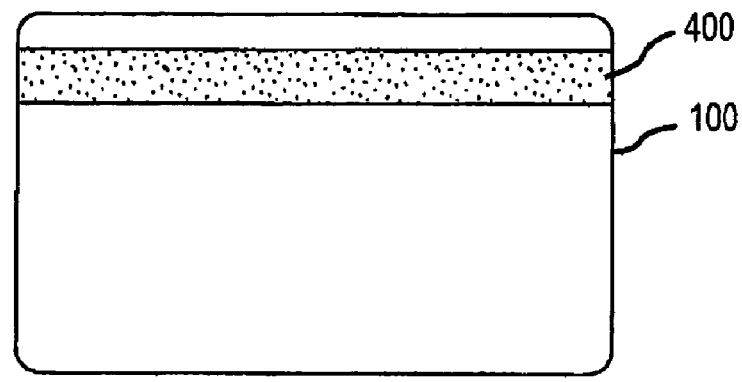
FIG. 4B illustrates a rear view of a presentation instrument system according to one embodiment of the present invention.

An information storage medium on presentation instrument 100 may include a magnetic strip or bar code that is adapted to store a unique identifier so that the user's account may be properly accessed, activated, and/or debited. The information storage medium can also comprise radio frequency identification, computer chips, or other magnetic, radio frequency, or electronic storage media that may be readable by existing card reader technology, such as a point of sale ("POS") terminals, or that may be otherwise adapted to store a unique identifier so that the user's account may be properly accessed, activated, and/or debited by existing or future instrument reader technology. For example, some or all the information may be encoded on instrument 100, such as in a magnetic strip 400 on the back side of instrument 100 as seen the cross-section view depicted in FIG. 4A or the rear view depicted in FIG. 4B. Here, magnetic strip 400 runs parallel to the instrument's largest dimension and is approximately 3/16 of an inch from the top edge of instrument 100. Magnetic strip 400 can store information, such as an account number, that can be read by a point of sale terminal.

For conventional contact transaction cards, the dimensions of presentation instrument 100 may be at least somewhat dictated by the requirements of the contact interface. As noted above, conventional transaction cards may include magnetic strip 400 that contacts a strip reader on a point of sale terminal when a user swipes the card to make a purchase or payment. In order to ensure interoperability between the magnetic strip readers and cards bearing magnetic strips, the parameters defining the magnetic strip are governed by the International Organization for Standardization (ISO) and the International Electrotechnical Commission (IEC). ISO/IEC 7811 provides standards for the physical characteristics of the magnetic strip including the location of the strip on the card, the surface profile of the strip, and the height of the strip above the card surface. In some cases, presentation instrument 100 can be a rectangular shape having standard credit card dimensions of approximately 2 1/8 inches high, 3 3/8 inches long, 1/8 of an inch corner radius, and 0.75 mm thick. It is appreciated that presentation instrument 100 may also be configured to conform with additional or alternative ISO standards, including, for example, standards 7810, 7816, and 8583.

Figure 5:
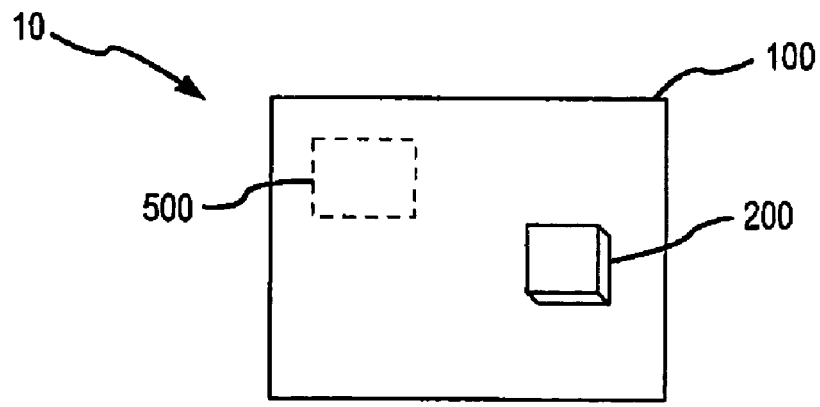
FIG. 5 illustrates a presentation instrument system according to one embodiment of the present invention.

In some cases, presentation instrument 100 may have a standard or non-standard shape and size, and may include a contactless integrated circuit such as a smart chip that allows transactions to be conducted without physical contact between instrument 100 and a transaction processing device at the point of sale. Because the transaction may be contactless, presentation instrument system 10 does not have to be limited only to shapes and sizes dictated by the ISO/IEC 7811 standard for contact transaction cards. For example, as seen in FIG. 5, presentation instrument 100 includes a contactless integrated circuit chip 500, which may include a wireless transmitter and/or receiver for exchanging information with a presentation instrument reader. Chip 500 may include an antenna for transmitting and receiving information associated with the transaction on a modulated RF carrier signal. Contactless IC chip 500 may be designed to conform to ISO/IEC standards for contactless integrated circuit cards and proximity cards, including the ISO/IEC 14443 standard, and/or the ISO/IEC 15693 standard, among others.

A transaction may be conducted by positioning presentation instrument 100 a proximate distance from the point of sale device capable of receiving a signal from instrument 100. Embodiments of the present invention also include having the point of sale device transmit a signal to the card, such as a handshake signal instructing the card to start transmitting data that can be used to process the transaction. The POS device may also transmit signals with information about the transaction or debit account associated with instrument 100 for storage on instrument 100. For example, when instrument 100 conforms to the ISO/IEC 14443 standard, a POS device (not shown) may send and receive messages about the transaction via a modulated RF field that has a carrier frequency of 13.56 MHz. Electronics that permits contactless transactions may also be added to or incorporated into presentation instrument 100 and/or chamber 200. The electronics may be an integrated circuit chip that includes an electromagnetic transmitter and/or receiver for wirelessly sending and/or receiving transaction information.

Presentation instrument 100 may include a variety of sizes, including but not limited to, standard sized credit cards such as the 3 3/8 inches by 2 1/8 inches by 0.03 inches thick conventional CR-80 type card. Embodiments of the present invention, for example, include presentation instruments 100 with a conventional rectangular shape, and dimensions of less than 3 3/8 inches in width and less than 2 1/8 inches in height, such as a minicard. Presentation instrument 100 may also be larger than standard-sized cards, although in some cases it may be desirable for presentation instrument 100 to have a size that is practical for being carried in a purse, wallet, pants pocket, and the like. It is understood, however, that presentation instrument 100 can be provided in virtually any form imaginable. For example, presentation instrument 100 can be provided in the form of a baseball cap, a necklace, a bracelet, shoes, a teddy bear, and the like. Such an instrument can be provided for sale to children at an amusement park, enabling the child to wear or carry the item, and have value decremented automatically as she partakes in amusements, or incremented automatically as she gains points in contests involving skill, chance, or a combination thereof.

Although certain preferred embodiments and methods have been disclosed herein, it will be apparent from the foregoing disclosure to those skilled in the art that variations, modifications, alternative constructions, and equivalents of such embodiments and methods may be made without departing from the true spirit and scope of the invention. Therefore, the above description should not be taken as limiting the scope of the invention which is defined by the appended claims.

What is claimed is:

1. A presentation instrument system, comprising:
 a presentation instrument selected from the group consisting of a credit card, a debit card, and a stored value card;
 an information storage medium configured to store a unique identifier; and
 a chamber that contains a fluid component and an object component;
 wherein the information storage medium and the chamber are coupled with the presentation instrument, and wherein the object component comprises a plurality of individually visible particles that can be freely dispersed throughout the fluid component upon shaking of the presentation instrument.

2. The presentation instrument system of claim 1, wherein the fluid component comprises a fluid, a gas, or a combination thereof.

3. The presentation instrument system of claim 1, wherein the information storage medium comprises a member selected from the group consisting of a magnetic strip, a bar code, and a contactless integrated circuit.

4. The presentation instrument system of claim 1, wherein the information storage medium comprises an integrated circuit having an antenna for transmitting and receiving data at the instrument.

5. The presentation instrument system of claim 1, wherein the presentation instrument comprises a signature strip.

6. The presentation instrument system of claim 1, wherein the presentation instrument comprises a presentation instrument advertisement.

7. The presentation instrument system of claim 1, wherein the object component comprises an object component advertisement.

8. The presentation instrument system of claim 1, wherein the presentation instrument is a credit card.

9. The presentation instrument system of claim 1, wherein the presentation instrument is a debit card.

10. The presentation instrument system of claim 1, wherein the presentation instrument is a stored value card.

11. The presentation instrument system of claim 1, wherein the object comprises a fluorescent or luminescent particle.

12. The presentation instrument system of claim 1, wherein the object comprises a figurine.

13. The presentation instrument system of claim 12, wherein the figurine comprises a cartoon character.

14. The presentation instrument system of claim 12, wherein the figurine comprises an animal.

15. The presentation instrument system of claim 12, wherein the figurine comprises an aquatic creature.

16. The presentation instrument system of claim 1, wherein the object comprises a global positioning system element.

17. A presentation instrument system, comprising:
 a presentation instrument selected from the group consisting of a credit card, a debit card, and a stored value card;
 an information storage medium configured to store a unique identifier; and
 a chamber having a fluid component and an object component, wherein the fluid component comprises water;
 wherein the object component comprises a plurality of items that float in or disperse throughout the fluid component, and the information storage medium and the chamber are coupled with the presentation instrument.

18. A method of making a presentation instrument system, comprising:
 providing a presentation instrument selected from the group consisting of a credit card, a debit card, and a stored value card;
 coupling an information storage medium with the presentation instrument; and
 coupling a chamber with the presentation instrument,
 wherein the chamber contains a fluid component and a plurality of individually visible particles that can be freely dispersed throughout the fluid component upon shaking of the presentation instrument.

19. The method of claim 18, wherein the fluid component comprises a fluid, a gas, or a combination thereof.

20. The method of claim 18, wherein the information storage medium comprises a member selected from the group consisting of a magnetic strip, a bar code, and a contactless integrated circuit.

21. The method of claim 18, wherein the information storage medium comprises an integrated circuit having an antenna for transmitting and receiving data at the instrument.

22. The method of claim 18, comprising placing a presentation instrument advertisement on the presentation instrument.

* * * * *